(12) United States Patent
Dinkel

(10) Patent No.: US 12,545,067 B2
(45) Date of Patent: Feb. 10, 2026

(54) FRICTION FREE ROLLER SPRING PERCH

(71) Applicant: KUHL RIDE PRODUCTS, LLC, San Luis Obispo, CA (US)

(72) Inventor: John Dinkel, Carmel Valley, CA (US)

(73) Assignee: Kuhl Ride Products LLC, San Luis Obispo, CA (US)

( * ) Notice: Subject to any disclaimer, the term of this patent is extended or adjusted under 35 U.S.C. 154(b) by 471 days.

(21) Appl. No.: 17/958,043

(22) Filed: Sep. 30, 2022

(65) Prior Publication Data
US 2023/0079083 A1    Mar. 16, 2023

Related U.S. Application Data

(63) Continuation-in-part of application No. 17/538,281, filed on Nov. 30, 2021, now abandoned, which is a
(Continued)

(51) Int. Cl.
*F16F 1/12*       (2006.01)
*B60G 11/16*      (2006.01)
(Continued)

(52) U.S. Cl.
CPC ............ *B60G 11/16* (2013.01); *B60G 13/005* (2013.01); *B60G 15/063* (2013.01); *F16F 1/12* (2013.01); *B60G 2202/12* (2013.01); *B60G 2204/124* (2013.01); *B60G 2204/418* (2013.01); *B60G 2206/72* (2013.01); *B60G 2206/8111* (2013.01); *B60G 2206/82012* (2013.01)

(58) Field of Classification Search
CPC .. F16F 1/12; F16F 2230/16; F16F 2230/0005; B60G 11/16; B60G 2204/124; B60G 2204/1244; B60G 13/005; B60G 15/063

USPC ........... 74/112; 267/170, 174, 178; 384/416, 384/418, 428, 440, 441, 504
See application file for complete search history.

(56) References Cited

U.S. PATENT DOCUMENTS 1,001,764 A * 8/1911 Linn ................... F16C 33/3713
                                                            384/504
1,364,675 A * 1/1921 Almfelt ................. F16C 19/184
                                                            384/504
(Continued)

FOREIGN PATENT DOCUMENTS

DE    102017215112 A1 *  2/2019 ................ F16F 9/54

OTHER PUBLICATIONS

DazeCars "Do It Yourself" Innovations for Classic Cars Roller Spring Perches, obtained from archive webpages, dated Aug. 15, 2014. (Year: 2014).*

*Primary Examiner* — Thomas J Williams
(74) *Attorney, Agent, or Firm* — Fitch, Even, Tabin & Flannery LLP

(57) ABSTRACT

A method for creating a roller spring perch has steps for making a steel frame bracket, procuring snap rings, procuring four bearings, machining a steel cylindrical bearing housing, machining a bearing shaft, assembling the bearing shaft to the bearing housing with the four bearings pressed onto each of two bearing lands, assembling the snap rings in snap ring grooves of the bearing shaft, placing the bearing housing with the bearing shaft and bearings centered through holes in sidewalls of the steel bracket; and spot welding the bearing housing to the sidewalls of the steel bracket.

6 Claims, 21 Drawing Sheets

Related U.S. Application Data continuation-in-part of application No. 16/688,161, filed on Nov. 19, 2019, now abandoned.

(51) Int. Cl.
 *B60G 13/00* (2006.01)
 *B60G 15/06* (2006.01)

(56) References Cited

U.S. PATENT DOCUMENTS

| | | | | | |
|---|---|---|---|---|---|
| 2,005,513 | A | * | 6/1935 | Weaver | B60G 11/14 280/124.179 |
| 5,538,274 | A | * | 7/1996 | Schmitz | B60G 7/02 280/124.135 |
| 5,820,150 | A | * | 10/1998 | Archer | F16F 1/38 280/124.141 |
| 6,309,109 | B1 | * | 10/2001 | Chuang | F16C 35/077 384/537 |
| 2021/0146741 | A1 | * | 5/2021 | Dinkel | B60G 15/063 |
| 2022/0088986 | A1 | * | 3/2022 | Dinkel | B60G 15/063 |
| 2023/0079083 | A1 | * | 3/2023 | Dinkel | B60G 15/063 280/124 |

\* cited by examiner

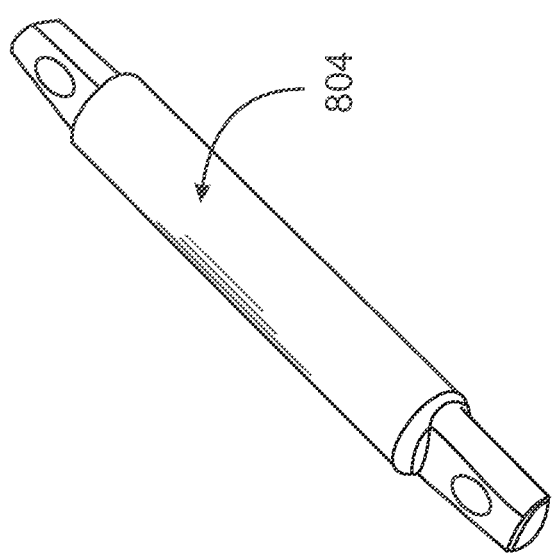
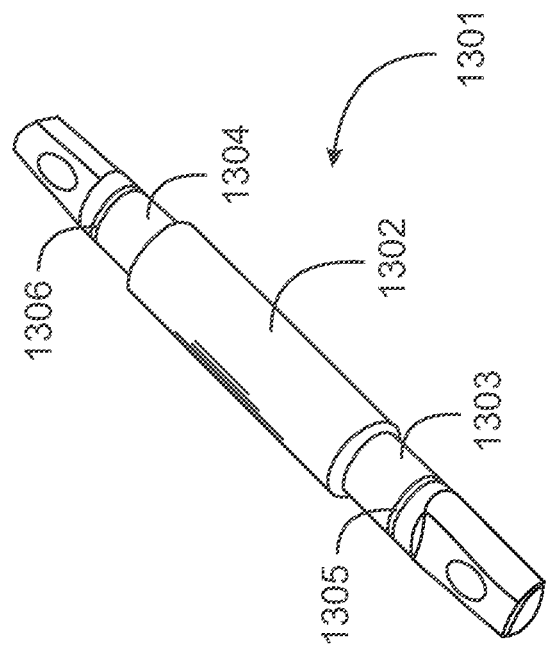
Fig. 13A
Fig. 13B

FRICTION FREE ROLLER SPRING PERCH

CROSS-REFERENCE TO RELATED APPLICATIONS

The instant application is a continuation-in-part (CIP) of co-pending application U.S. application Ser. No. 17/538,281 filed 30 Nov. 2021, which is a CIP of U.S. application Ser. No. 16/688,161 filed 19 Nov. 2019. All disclosure of the parent application is incorporated at least by reference.

BACKGROUND OF THE INVENTION

1. Field of the Invention

The present invention is in the technical area of automotive suspension and pertains mare particularly to perch apparatus for engaging compression springs and shock absorbers in suspension systems.

2. Description of Related Art

Spring perches are known in the art and are apparatus having an interface for nesting one end of a compression spring and a shock absorber within the compression spring, the apparatus on a pivot mounted to an upper control arm in an automobile suspension system. The spring perch rotates to compensate for changing alignment of elements as a suspension system operates. An axle through the spring perch provides rotation, and the axle is mounted to the upper control arm.

A spring perch is known in the art with bearings in housings to provide free rotation about the axle mounted to the control arm, but the bracket for the spring perch has bearing housings that are quite large in diameter, and separate in the apparatus, and manufacture of this prior art spring perch is difficult, time-consuming and expensive.

What is clearly needed in the art is a spring perch that provides housing for roller bearings, but is simpler, and comparatively inexpensive to manufacture.

BRIEF SUMMARY OF THE INVENTION

In an embodiment of the invention a method for creating a roller spring perch is provided, comprising manufacturing a steel bracket having a bed with two shaped regions formed to accommodate mounting to a suspension spring, holes for mounting to shock absorbers, and two sidewalls each having a hole of a first diameter, the holes aligned on an axis orthogonal to the sidewalls, procuring two snap rings of a particular make and model, procuring four bearings of a particular make and model, each bearing having a second outer diameter, a third inner diameter, and a first width, machining a steel cylindrical bearing housing of a fourth diameter with a first length, a central bore of a fifth diameter, and counterbores of a sixth diameter on each end to a second length from each end, machining a bearing shaft with a central axis, the bearing shaft of a third length greater than the first length, the bearing shaft having central region of a seventh diameter less than the fifth diameter, bearing lands to each side of the central region, the bearing lands having each an eighth diameter as a press fit to the third inner diameter of the bearings, a fourth length twice the first width of the bearings, and a snap ring grooves at an end of each bearing land away from central region, the bearing shaft further having a flattened region on each end with a through hole at a right angle to the central axis of the bearing shaft, assembling the bearing shaft to the bearing housing with two of the four bearings pressed onto each of the two bearing lands and the bearings fit into the counterbores of the bearing housing, assembling the snap rings in the snap ring grooves of the bearing shaft, completing an assembly of the bearing housing, the bearing shaft and the bearings, placing the bearing housing with the bearing shaft and bearings centered through the holes in the sidewalls of the steel bracket, and spot welding the bearing housing to the sidewalk of the steel bracket.

In one embodiment the method further comprises, in the step for spot welding, making two spot welds from the bearing housing to the inner surface of each side wall of the bracket. Also in one embodiment the method further comprises, in the step for making two spot welds from the bearing housing to the inner surface of each side wall of the bracket, placing the spot welds on opposite sides of the bearing housing, with no spot weld at the top or bottom. In one embodiment the method further comprises painting the assembled roller spring perch. In one embodiment the method further comprises adhering mounting pads to the two shaped regions formed to accommodate mounting to a suspension spring. And in one embodiment the method further comprises assembling a bolt through the hole in the flattened region at each end of the bearing shaft and adding a nut to each bolt, for fastening the roller spring perch to an upper control arm of a suspension.

In another aspect of the invention a roller spring perch is provided, comprising a steel bracket having a bed with two shaped regions formed to accommodate mounting to a suspension spring, holes for mounting to shock absorbers, and two sidewalls each having a hole of a first diameter, the holes aligned on an axis orthogonal to the sidewalls, two snap rings of a particular make and model, four bearings of a particular make and model, each bearing having a second outer diameter, a third inner diameter, and a first width, a steel cylindrical bearing housing of a fourth diameter with a first length, a central bore of a fifth diameter, and counterbores of a sixth diameter on each end to a second length from each end, a bearing shaft with a central axis, the bearing shaft of a third length greater than the first length, the bearing shaft having central region of a seventh diameter less than the fifth diameter, bearing lands to each side of the central region, the bearing lands having each an eighth diameter as a press fit to the third inner diameter of the bearings, a fourth length twice the first width of the bearings, and a snap ring grooves at an end of each bearing land away from central region, the bearing shaft further having a flattened region on each end with a through hole at a right angle to the central axis of the bearing shaft. The bearing shaft is assembled to the bearing housing with two of the four bearings pressed onto each of the two bearing lands and the bearings fit into the counterbores of the bearing housing, the snap rings are assembled to the snap ring grooves of the bearing shaft, completing an assembly of the bearing housing, the bearing shaft and the bearings, the bearing housing is placed with the bearing shaft and bearings centered through the holes in the sidewalls of the steel bracket, and the bearing housing is spot welded to the sidewalk of the steel bracket.

In one embodiment of the apparatus the spot welds are made from the bearing housing to the inner surface of each side wall of the bracket. Also, in one embodiment the spot welds are placed on opposite sides of the bearing housing, with no spot weld at the top or bottom. Also, in one embodiment the assembled roller spring perch is painted after assembly. In one embodiment mounting pads are adhered to the two shaped regions formed to accommodate mounting to a suspension spring. And in one embodiment the apparatus further comprises a bolt assembled through the hole in the flattened region at each end of the bearing shaft and a nut added to each bolt, for fastening the roller spring perch to an upper control arm of a suspension.

BRIEF DESCRIPTION OF THE SEVERAL VIEWS OF THE DRAWINGS

FIG. 13A is a perspective view of a shaft removed from the assembly of FIG. 8 after the bushing is burned away.

FIG. 13B is a perspective view of the shaft of FIG. 13A machined to provide a new shaft in an embodiment of the invention.

DETAILED DESCRIPTION OF THE INVENTION

Figure 1:
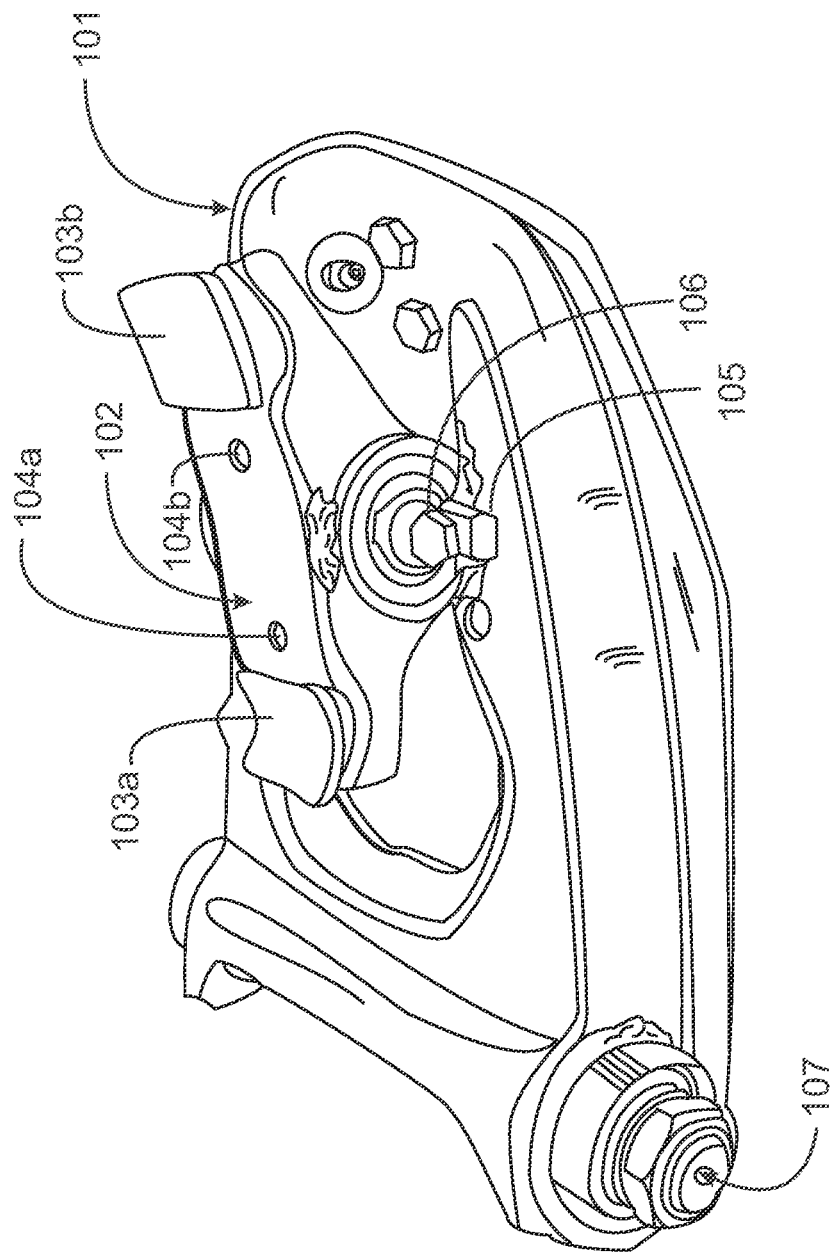
FIG. 1 is perspective view of a spring perch mounted on an upper control arm in an embodiment of the present invention.

FIG. 1 is perspective view of a spring perch 102 mounted on an upper control arm 101 in an embodiment of the present invention. Spring perch 102 is a rocker assembly rotatable about an arm 105 that passes through bearings in the spring perch. Arm 105 is bolted in this example to the upper control arm 101 by bolts 106 seen on one side, hidden on the other side. The spring perch has pads 103*a* and 103*b* to accept opposite sides of a large compression spring in the suspension system, and holes 104*a* and 104*b* are for securing a lower end of a shock absorber in the suspension system. It may be seen, as is conventional, that the upper control arm 101 rotates as a cantilever about an axis 107, which axis extends in the direction of travel of the automobile for which the suspension system serves. The axis of arm 105, about which the roller spring perch rotates is parallel to the axis of the upper control arm. As the upper control arm changes angle, the roller spring perch does as well, compensating for misalignment.

Figure 2:
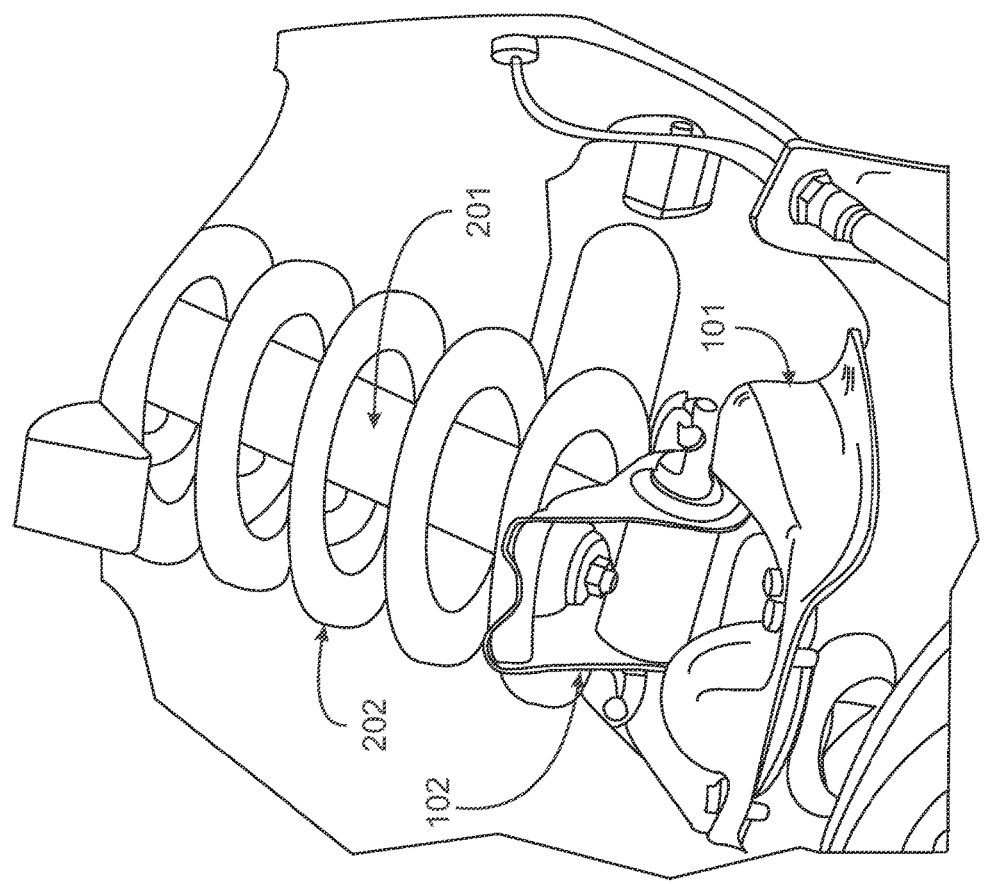
FIG. 2 is a perspective view of a spring perch on an upper control arm in context with other elements of an automotive suspension system.

FIG. 2 is a perspective view of spring perch 102 and upper control arm 101 of FIG. 1 in context with other elements of an automotive suspension system. In this example compression spring 202 and shock absorber 201 are shown as they interact with the spring perch and upper control arm. FIG. 2 is intended to provide further understanding of the role of the spring perch and the upper control arm in the suspension.

Figure 3:
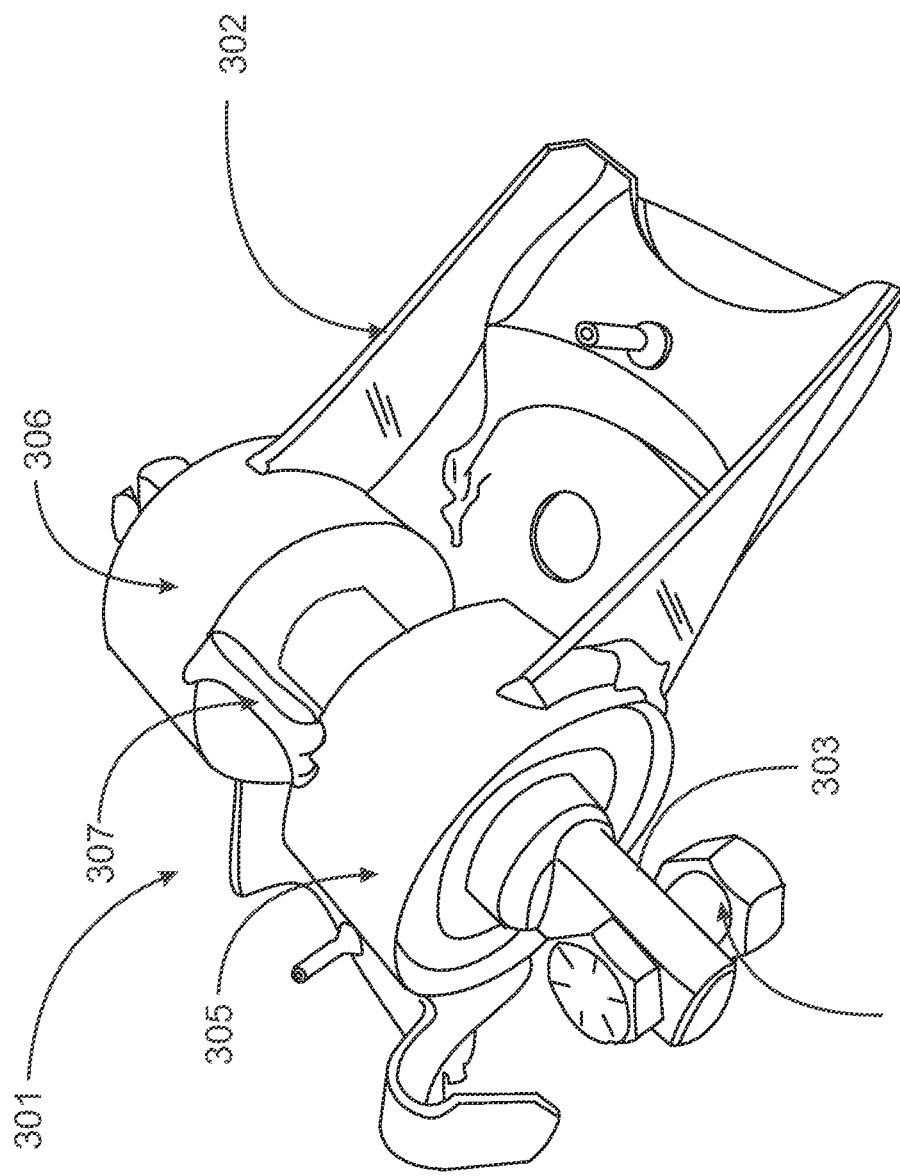
FIG. 3 is a perspective view of spring perch as existing in the prior art.

It was stated above in the Background section that roller spring perches are not necessarily new in the art. FIG. 3 is a perspective view of roller spring perch 301 as existing in the prior art, made commercially available by a company named Opentracker Racing, of Carmel Valley, California. It may be seen that roller spring perch 301 has a bracket 302, which provides mounting positions for pads for opposite sides of an end of a large compression spring, as shown in FIG. 2, and holes for secu8ring to an end of a shock absorber. In the example of FIG. 3 two separate, large diameter bearing housings, 305 and 306 are welded into the bracket. Bearings are mounted in each of housing 305 and 306, and arm 303 is part of an axle that passes all the way through the bearings in both bearing housings. In this example bearing housings 305 and 306 are joined by a welded in strut 307 for strength and stability.

In manufacturing and assembly of the prior art roller spring perch as shown in FIG. 3, the inventor became convinced that there had to be a better and less expensive way to implement the roller spring perch.

Figure 4:
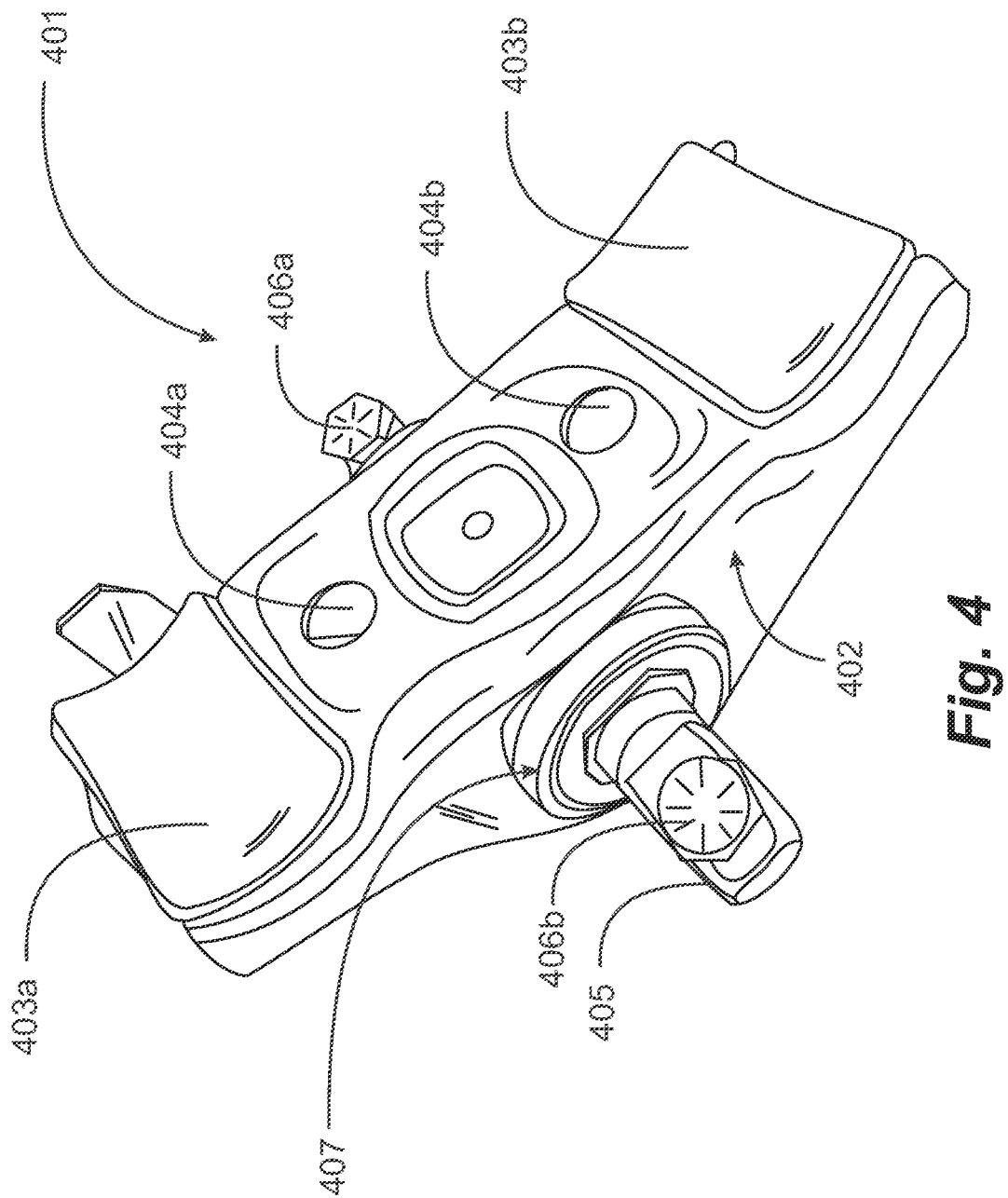
FIG. 4 is a perspective view of a roller spring perch in an embodiment of the present invention.

FIG. 4 is a perspective view of a roller spring perch 401 in an embodiment of the present invention. Spring perch 401 has a steel bracket 402 which may be the same bracket upon which prior art spring perch 301 is implemented. The bed of the bracket is the same as in the prior art apparatus, providing seats for pads 403*a* and 403*b* to accept opposite sides of an end of a large compression spring. Hole 404*a* and 404*b* are common to the prior art apparatus as well, for securing to one end of the shock absorber. In the example of FIG. 4, however, bearing housing is accomplished within an inside diameter of a single tube 407 that passes through bracket 402 side-to-side. Tube 407 is counterbored, as shown below with reference to FIGS. 5, 6 and 7, to provide seating for two roller bearings upon which the shaft of arm 405 turns. Bolts 406a and 406b are bolts, passing through flattened ends of shaft 405 to secure the roller spring perch to the control arm.

Figure 5:
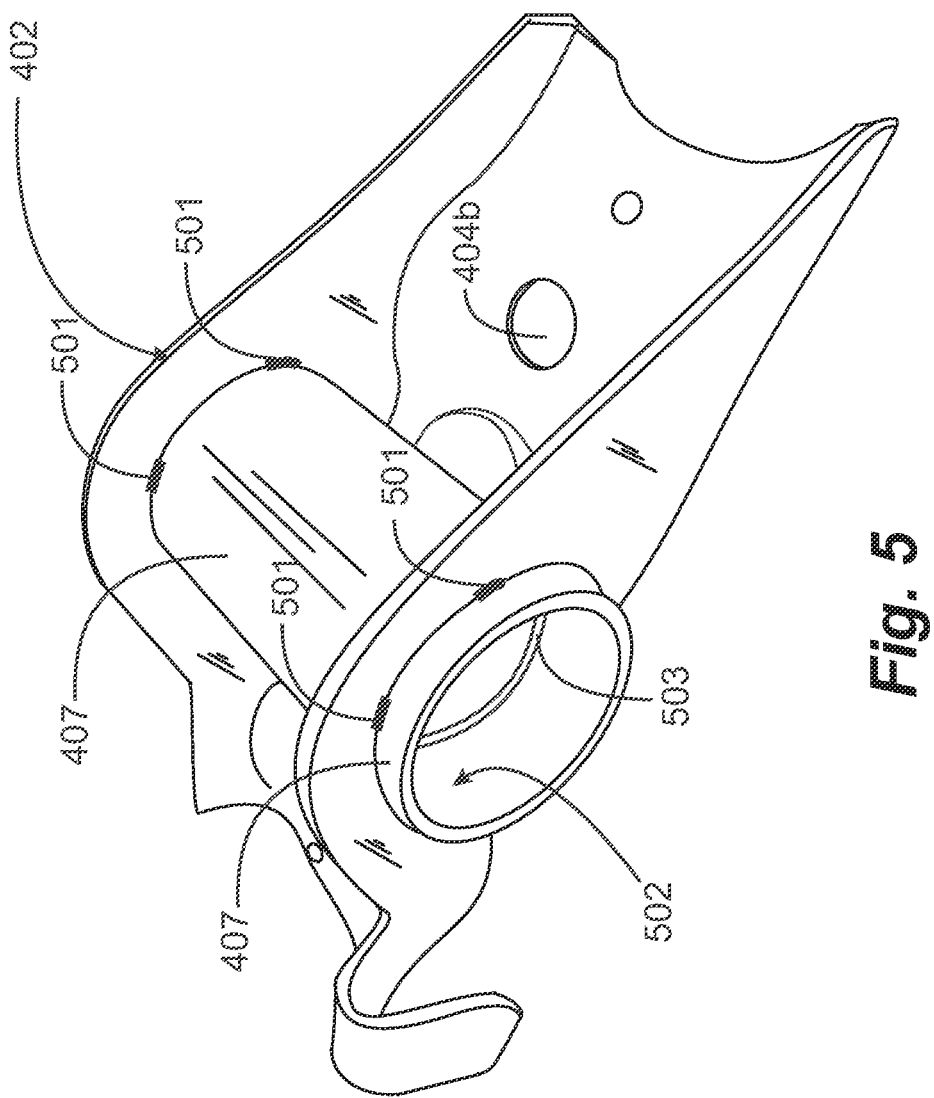
FIG. 5 is a perspective view of a bracket and tube assembly at one stage in making a spring perch according to the invention.

FIG. 5 is a perspective view of a bracket and tube assembly at one stage in making a spring perch according to the invention. FIG. 5 shows bracket 402 inverted to be seen from below and shows tube 407 passing through both sides of bracket 402. The bracket is bored on both sides with holes of inside diameter substantially equal to the outside diameter of tube 407. The tube is inserted, and spot welded at points 501 in this example, extending a short dimension outside the sides of the bracket on each side, as shown.

Tube 407, prior to assembly to the bracket, is counterbored on each end to an inside diameter 502 to a set depth to a shoulder 503. The diameter of this counterbore is controlled to provide a press fit for bearings that will be assembled after the tube is welded in the bracket. In an alternative embodiment the bearings may be press fit before the tube is welded through the bracket.

Figure 6:
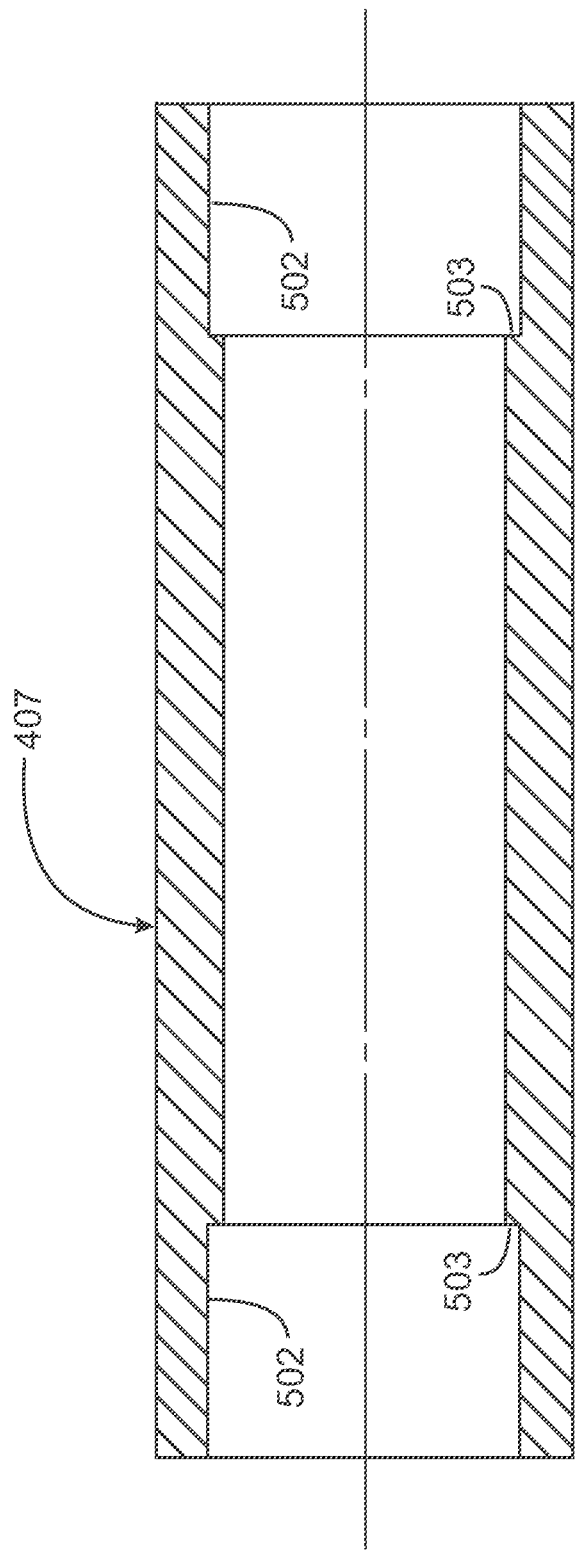
FIG. 6 is a plan view of the bracket and tube assembly of FIG. 5.

FIG. 6 is a section view of tube 407, showing counterbores 502 and shoulders 503 at each end of the tube. In process of manufacture a roller bearing is inserted and pressed into the counterbore from each end. A shaft 405 (see FIG. 4) has retainer grooves, not shown, at positions for accepting clips that hold the assembly together one the shaft is inserted through the bearings and the retainer clips are inserted.

The implementation of a single tube, spot welded through the bracket as detailed in FIGS. 5 and 6, reduces the material and labor cost in manufacture by at least fifty percent and results in a simpler product as well.

Figure 7:
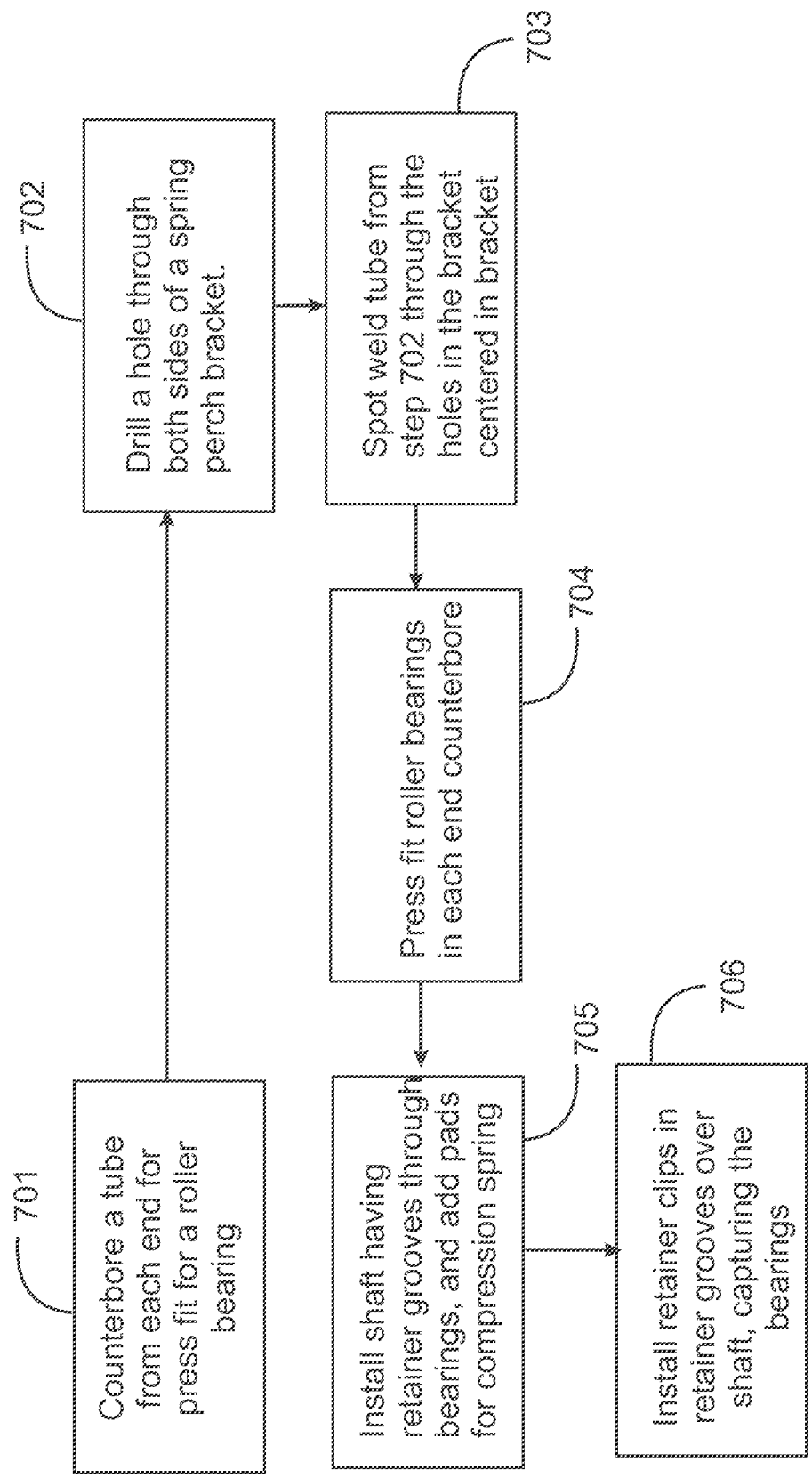
FIG. 7 is a perspective view of the tube in the view of FIGS. 5 and 6.

FIG. 7 is a flow diagram illustrating a method for constructing a roller spring perch. At step 701 a tube of sufficient length for a particular spring perch is counterbored from each end with an inside diameter for the bore to accomplish a press fit for roller bearings to be used for the roller spring perch under construction. At step 702 holes are drilled through both sides of a spring perch bracket. The bracket may be a new bracket, or a bracket retrieved from a prior art spring perch.

At step 703 the tube is inserted through the holes made in step 703, and spot welded to the bracket, centered through the bracket. At step 704 roller bearings are press fit into the counterbores from each end of the tube. Alternatively, the bearings may be press fit into the tube before the tube is spot welded through the bracket. At step 705 a shaft having retainer groves is inserted through the bearings and pads are added to interface to the compression spring. Retainer clips are inserted to the grooves in the shaft at step 706 to retain the bearings in the tube.

New Roller Spring Perch from Original Equipment Spring Perch

In another aspect of the invention a new roller spring perch apparatus, and a method for creating the new apparatus from an existing original equipment apparatus is provided.

Figure 8:
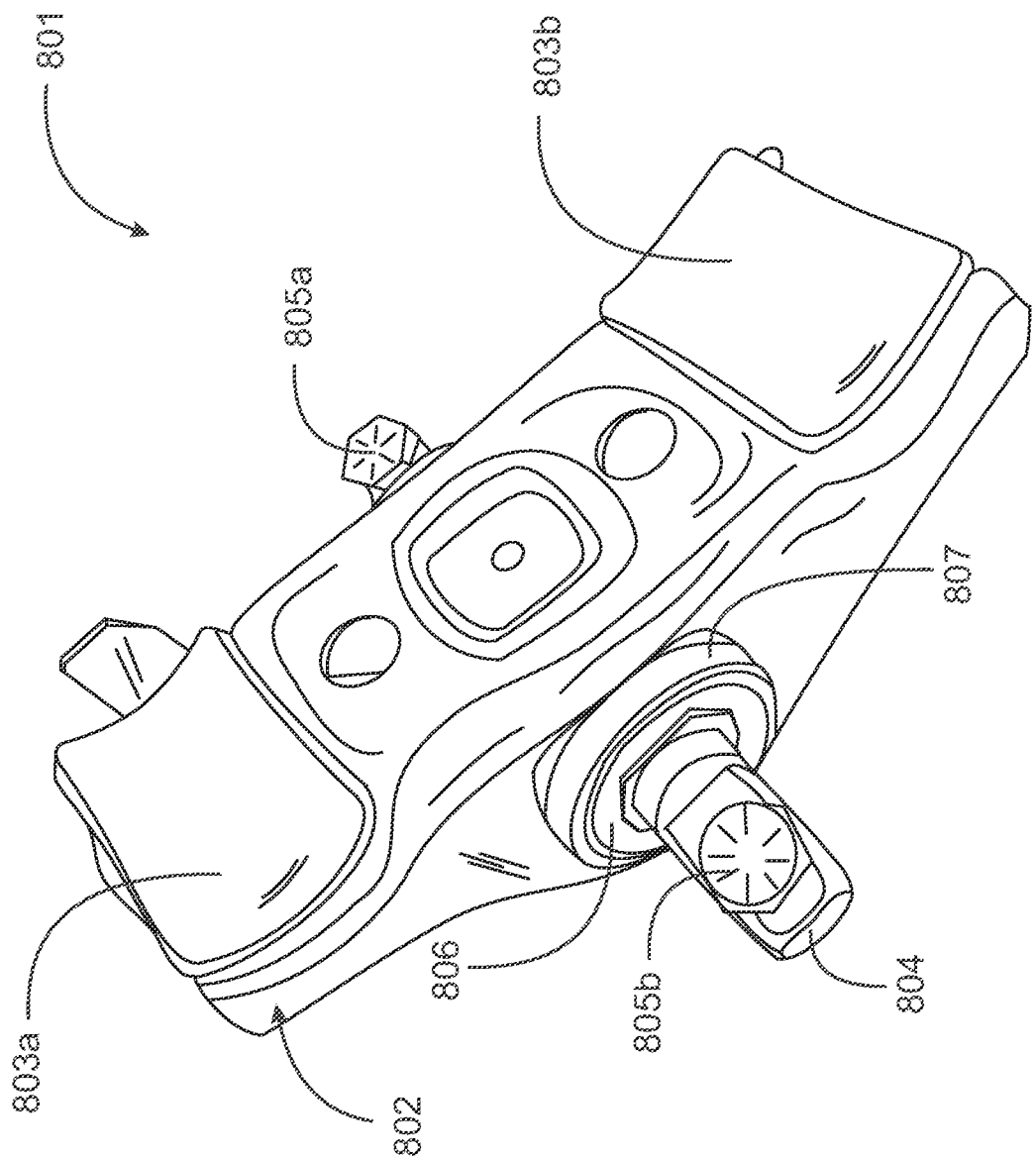
FIG. 8 is an illustration of a prior art spring perch with a rubber bushing.

In the current art original equipment spring perches are known comprising a frame, a mounting tube, a shaft with interfaces each end for mounting the original equipment spring perch to a control arm of a suspension system of a vehicle, and a hard rubber bushing cast between the shaft and an inside diameter of the mounting tube. FIG. 8 is a perspective illustration of one such prior art spring perch 801, having a steel frame 802, rubber pads 803a and 803b to interface to an end of a large diameter spring in the vehicle suspension, a mounting shaft 804 that passes through the perch frame, with bolts 805a and 805b for securing the shaft at each end to a control arm, a rubber bushing 806 and a tube 807 that is welded through a hole through frame 802. Bushing 806 is intimate to the shaft 804 and to the inside of tube 807, and provides, through flexibility of the rubber, a minimal rotation of shaft 804 relative to tube 807.

Figure 9:
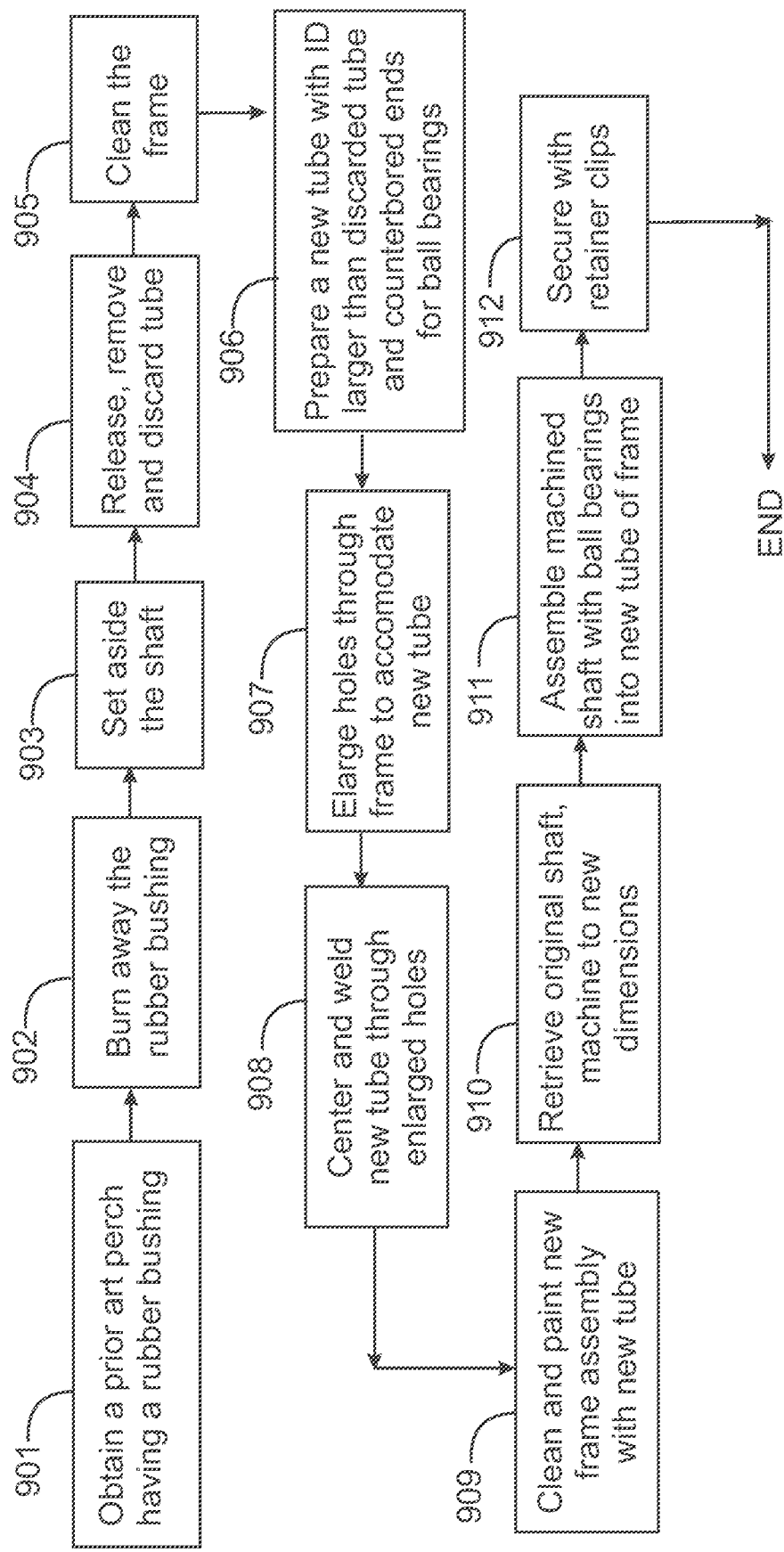
FIG. 9 is a flow diagram of a process in an embodiment of the present invention.

FIG. 9 is a flow diagram illustrating a process in an embodiment of the invention for creating a new roller spring perch starting with a prior art perch such as shown and described with reference to FIG. 8.

At step 901 in the process depicted in FIG. 9 a prior art spring perch is obtained from any source, such as an existing vehicle or a sales enterprise. This prior art sprig perch is depicted in FIG. 8, having a rubber bushing between the shaft and the tube through the frame. At step 902 the rubber bushing is burned away, leaving the shaft and frame assembly without the rubber bushing. The removal of the bushing by burning may be done in any one of several ways, such as heating and burning with a torch, or firing the assembly in a hearth or oven until the bushing ignites and burns away. In an alternative embodiment the bushing may be removed by chemical means, such as with acid.

Figure 10A:
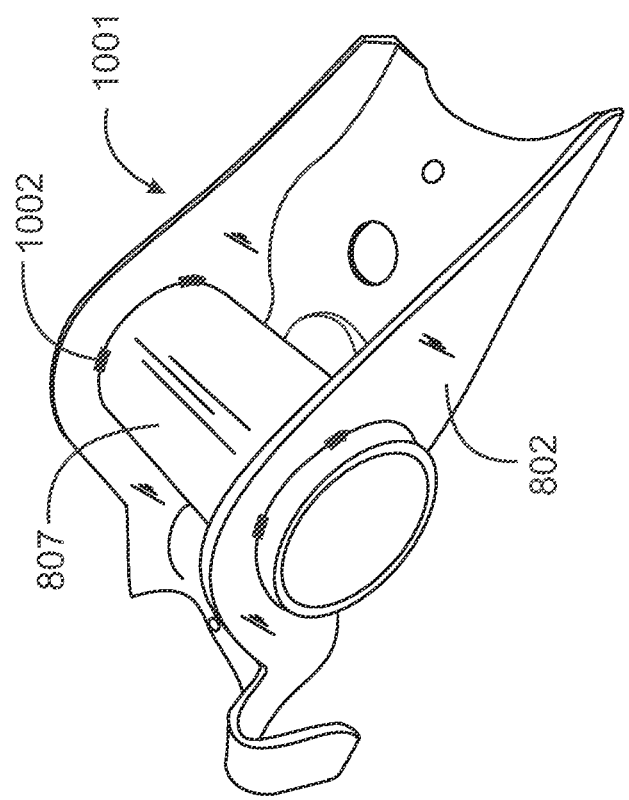
FIG. 10A is a perspective view of a frame and tube with bushing burned away in an embodiment of the invention.
Figure 10B:
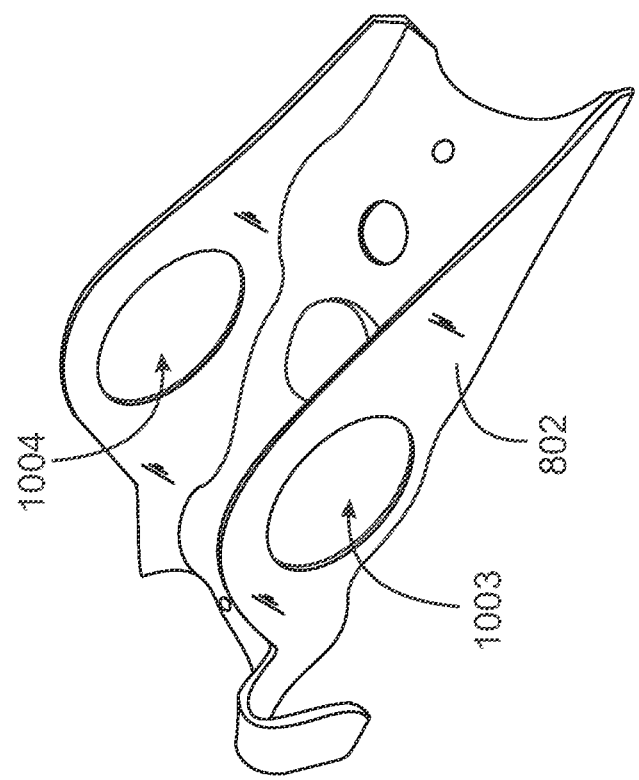
FIG. 10B is a perspective view of the frame of FIG. 10A with the tube removed.

At step 903 the shaft is set aside for later use. at step 904 the existing tube welded through the frame is released, such as by grinding away the welds that hold it to the frame and removing and discarding the tube. At step 905 the frame with the tube removed is cleaned. FIG. 10A illustrates an assembly 1001 comprising frame 802 with original tube 807 still in place by welds 1002. FIG. 10B illustrates frame 802 with tube 807 removed and discarded, leaving holes 1003 and 1004 through the frame.

Figure 11:
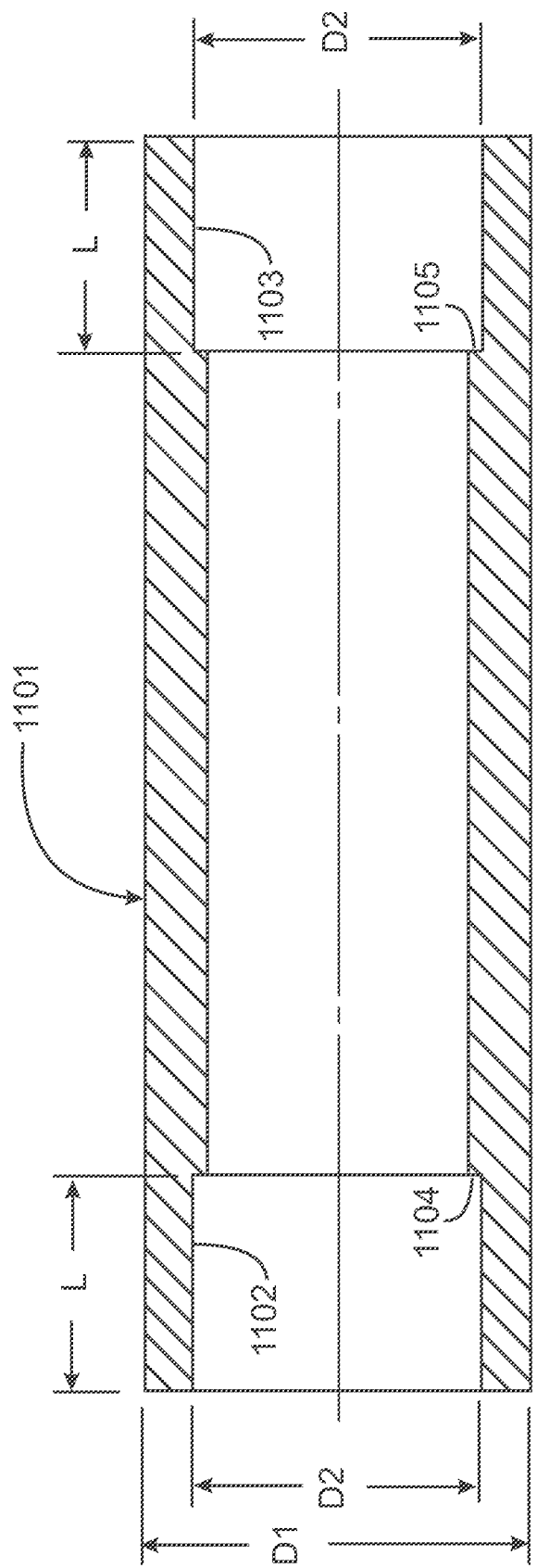
FIG. 11 is a cross-section view of a new tube in an embodiment of the invention.

At step 906 a new tube is prepared, illustrated in FIG. 11 in cross section, having a length the same as the original tube, but a somewhat larger outside diameter D1, and counterbores 1102 and 1103, from each end, with inside diameter D1 equal to an outside diameter of ball bearings to be used in the new roller spring perch assembly. The counterbores in one embodiment have a depth L, resulting in shoulders 1104 and 1105, the depth equal to twice the width of one of the ball bearings to be used, so the tube may accommodate two bearings on each end.

Figure 12:
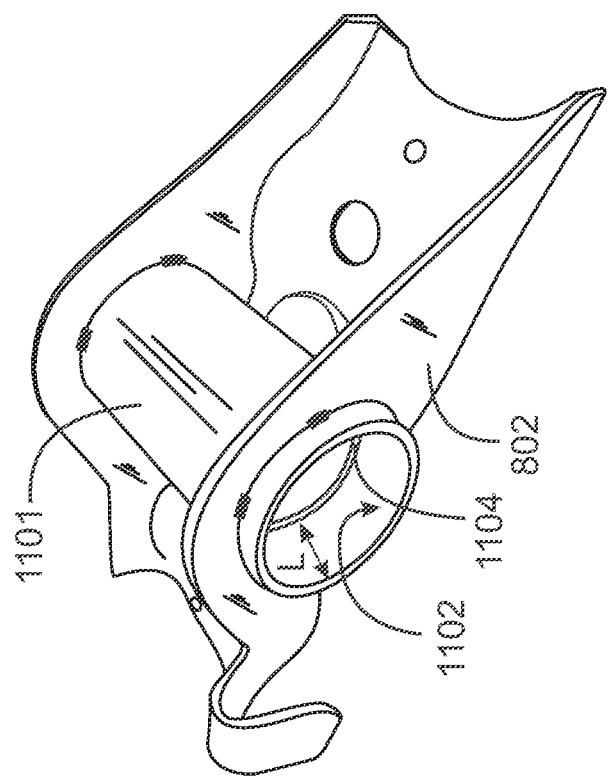
FIG. 12 is a perspective view of the frame of FIG. 10B with the new tube of FIG. 11 welded in place in an embodiment of the invention.

At step 907 holes 1003 and 1004 are enlarged somewhat to accommodate larger outside diameter D1 of the new tube. At step 908 the new tube is inserted through the enlarged holes in the frame, centered, and spot welded in this example in place. FIG. 12 illustrates frame 802 with new tube 1101 in place, showing counterbore 1102 of depth L at one end, also showing shoulder 1104, and counterbore 1103 at the opposite end, showing shoulder 1105. At step 909 the new frame assembly with tube 1101 in place may be cleaned and painted.

At step 910 shaft 804 that was removed previously is retrieved and machined to accommodate the new ball bearings that are to be assembled to provide the new roller spring perch. FIG. 13A illustrates original shaft 804, which in almost all cases has a common diameter along the length that passes through the tube and frame, FIG. 13B illustrates a new shaft 1301 machined from old shaft 804. The new shaft is machined to have a central region 1302 with a diameter essentially the same as the outside diameter of old shaft 804, and end regions 1303 and 1304 of a common lesser diameter that provides a slip fit for the inside diameter of ball bearings to be assembled between the new shaft and new tube 1101. Shallow grooves 1305 and 1306 are machined to accommodate spring retainers in assembly.

Figure 14:
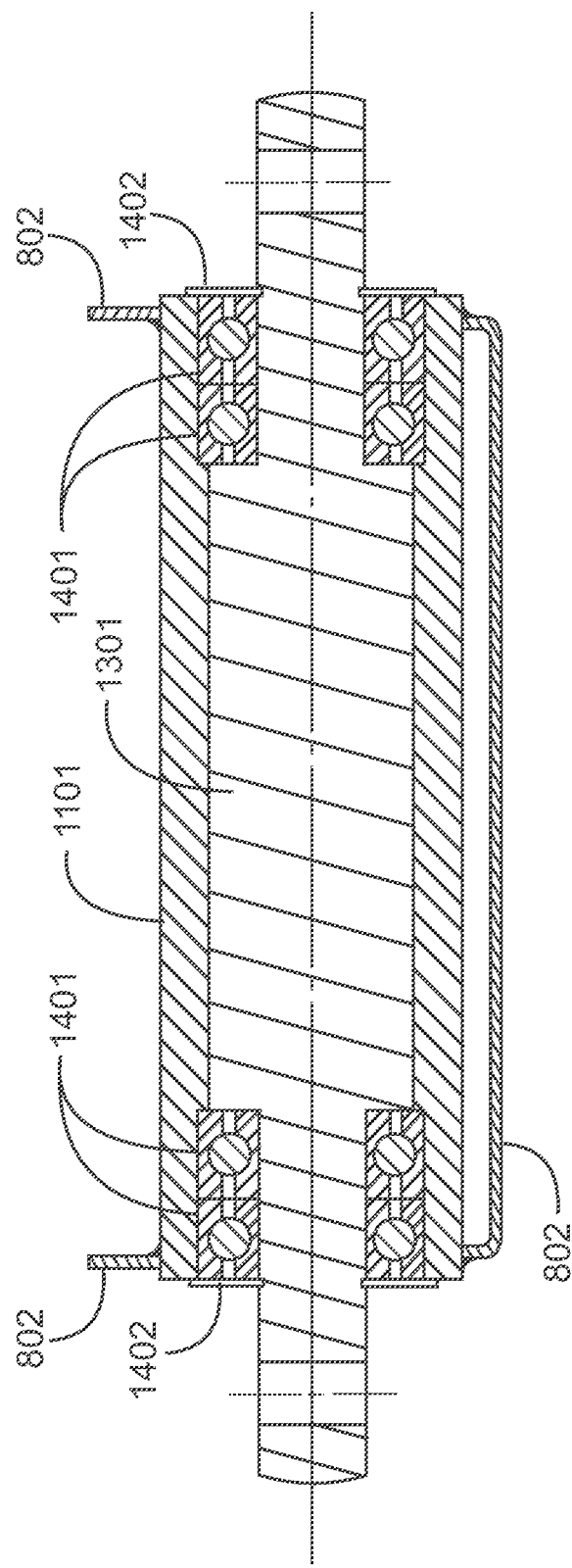
FIG. 14 is a sectioned view of a new roller spring perch in an embodiment of the invention.

At step 911 new shaft 1301 is assembled with four ball bearings 1401 into tube 1104 that was welded into frame 802 in step 908, as illustrated in cross-sectioned assembly view FIG. 14. At step 912 the bearings are secured by adding spring clips 1402 that snap into the grooves 1305 and 1306 seen in FIG. 13B. At this point the new roller spring perch is complete and may be packaged and stored for sale.

The order of the steps may be different in another embodiment, wherein, for example, the new tube and shaft may be assembled with the ball bearings before the tube and shaft assembly is welded into frame 802.

In yet another embodiment of the invention a roller spring perch is manufactured primarily from raw materials without using any part from a previously existing spring perch.

Figure 15:
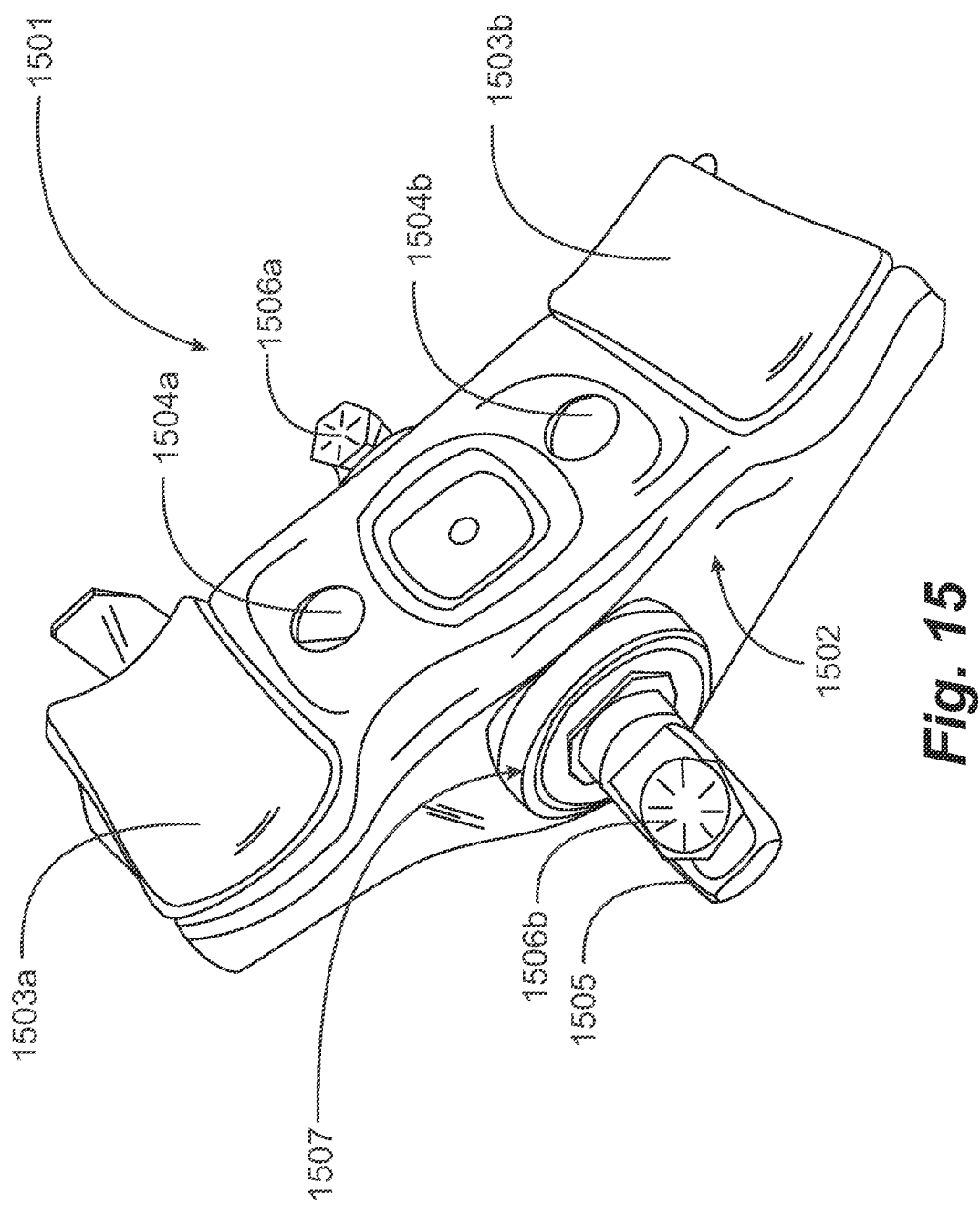
FIG. 15 is a perspective view of a spring perch in another embodiment of the invention.

FIG. 15 is a perspective view of a finished roller spring perch 1501 in this new embodiment of the invention. Spring perch 1501 has a steel bracket 1502 which may be the same bracket upon which prior art spring perch 301 is implemented. The bed of the bracket is the same as in the prior art apparatus, providing seats for pads 1503a and 1503b to accept opposite sides of an end of a large compression spring. Hole 1504a and 1504b are common to the prior art apparatus as well, for securing to the shock absorber. In the example of FIG. 15 the bearing housing is accomplished within an inside diameter of a single tube 407 that passes through bracket 1502 side-to-side. Tube 1507 is counterbored, as shown below with reference to FIGS. 16, 17 and 18, to provide seating for two roller bearings upon which the shaft of arm 1505 turns. Elements 1506a and 1506b are bolts, passing through flattened ends of shaft 1505 to secure the roller spring perch to the control arm.

Figure 16:
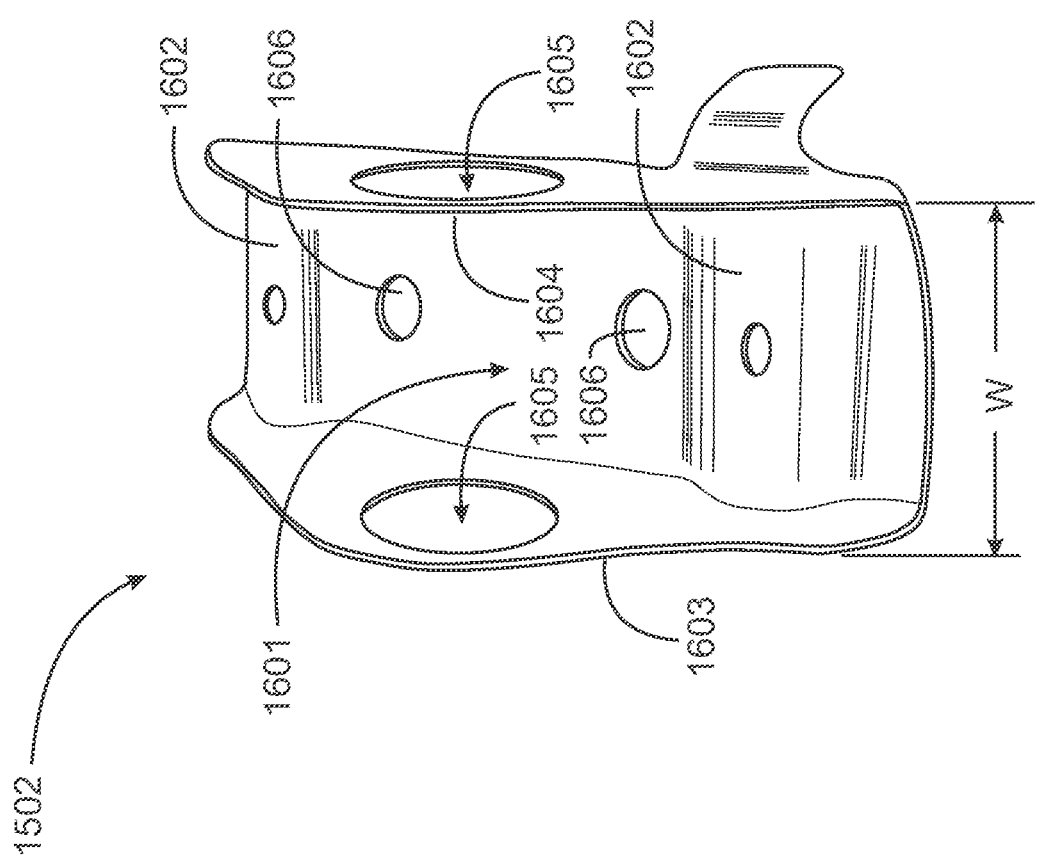
FIG. 16 is a perspective view of a bracket of the spring perch of FIG. 15 in an embodiment of the invention.

FIG. 16 is a perspective view of steel bracket 1502 which is stamped and machined as a foundation bracket for the unique spring perch in an embodiment of the invention. Bracket 1502 has a bed 1601 shaped with regions 1602 to accommodate mounting to a suspension spring and mounting holes 1606 for fastening to ends of shock absorbers. Bracket 1502 has two opposite side walls 1603 and 1604 with holes 1605 machined for mounting a shaft and bearing assembly described below. A width W is a dimension between the outside surfaces of the sidewalls.

Figure 17:
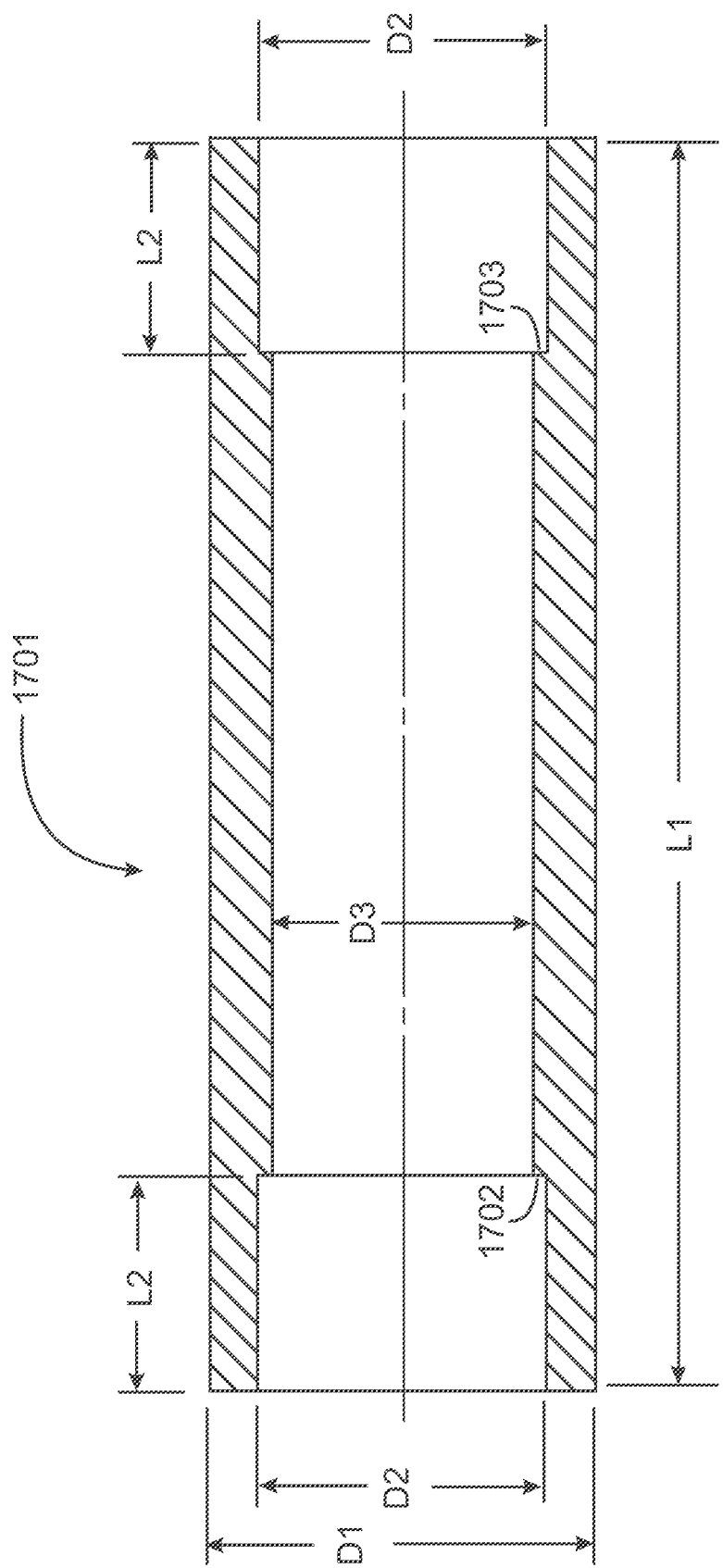
FIG. 17 is a section view of a bearing housing fir the spring perch of FIG. 15 in an embodiment of the invention.
Figure 18:
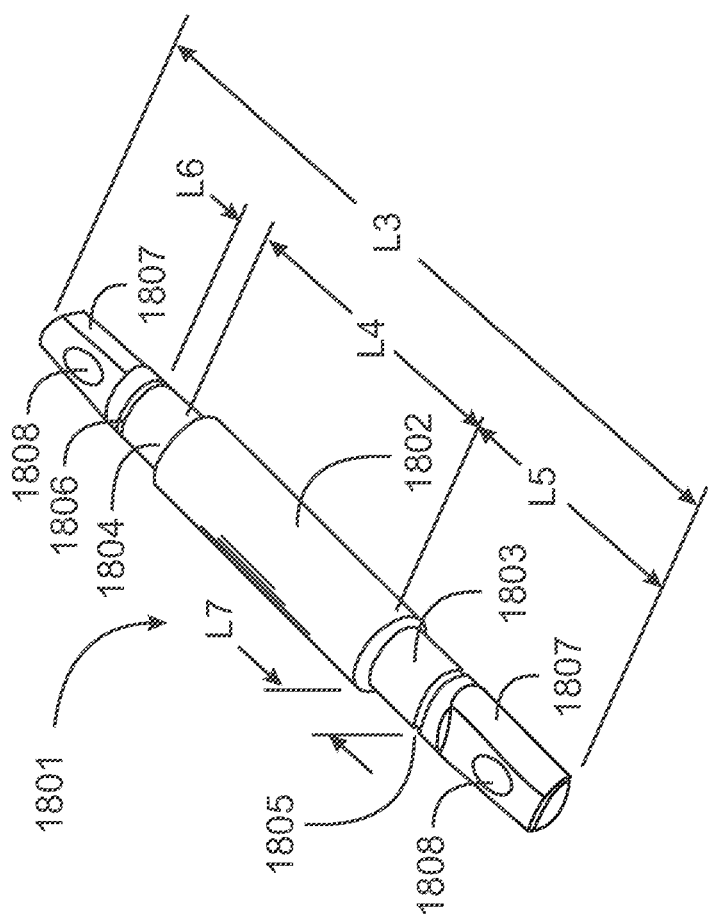
FIG. 18 is a perspective view of a bearing shaft used with the roller spring perch of FIG. 15 in an embodiment of the invention.

FIG. 17 is a section view of a steel bearing housing 1701 in an embodiment of the invention. Bearing housing 1701 is cylindrical with a minimum inside diameter D3 and an outside diameter D1. Diameter D1 is a slip fit for holes 1605 in the sidewalls of bracket 1502. Housing 1701 has a length L1 which may be greater than the width W over the outside surfaces of the sidewalls of bracket 1502. Housing 1701 is counterbored to a diameter of D2 from each end over a length of L2, providing shoulders 1702 and FIG. 18 is a perspective view of a bearing shaft 1801 used in the roller spring perch 1501 of FIG. 15. Bearing shaft 1801 has a section 1802 of a maximum diameter and a length L4 centered on the length L3 of shaft 1801. A section 1803 and a section 1804 extend to each side of center section 1802 and are of a length L6 and L7 respectively. L6 and L7 are equal and are twice the thickness of one of four bearings used in roller spring perch 1501. Roves 1805 and 1806 are machined into shaft 1801 at ends of sections 1903 and 1804 away from center section 1802. The groves are for snap rings that hold bearing in place on the shaft in a bearing assembly described further below.

Figure 19A:
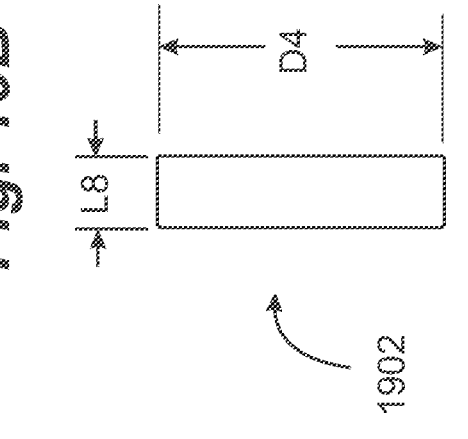
FIG. 19A is a view of a snap ring usable in the spring perch of FIG. 15 in an embodiment of the invention.
Figure 19B:
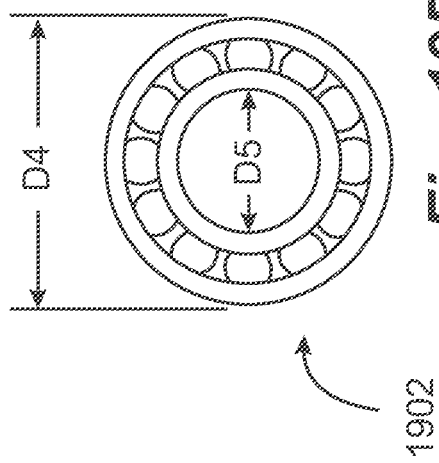
FIG. 19B is an illustration of a bearing usable in the spring perch of FIG. 15 in an embodiment of the invention.
Figure 19C:
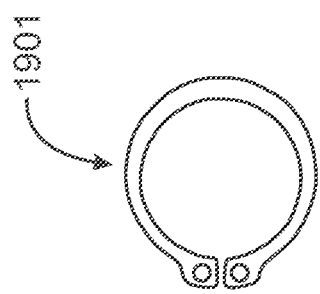
FIG. 19C is a side elevation of the bearing of FIG. 19B in an embodiment of the invention.

FIG. 19A is a face on view of a snap ring 1901 usable to hold the bearings in place on the shaft in the bearing assembly described further below. Snap ring 1901 is selected to be compatible with grooves 1805 and 1806 in bearing shaft 1801. FIG. 19B is a face on view of one of four bearings 1902 used in the roller spring perch 1501, and FIG. 19C is a side elevation view of bearing 1902. Bearing 1902 has an outside diameter D4 which is a press fit for counterbore diameter D2 of bearing housing 1701. Bearing 1902 has a width L8 which is on-half of L2 of housing 1701.

Figure 20:
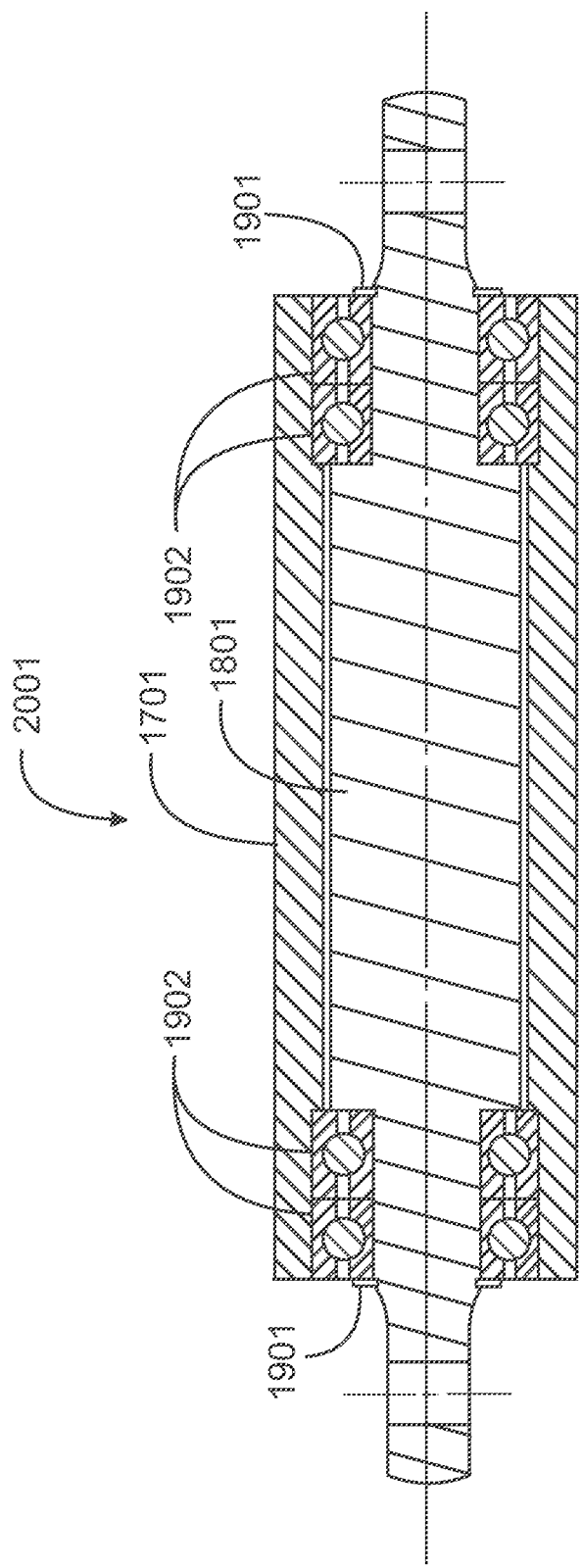
FIG. 20 is a partial section view of a bearing assembly of the spring perch of FIG. 15 in an embodiment of the invention.

FIG. 20 is a partial section view of a bearing assembly 2001 of spring perch 1501. Bearing assembly 2001 comprises housing 1701 assembled with shaft 1801 and four bearings 1902 pressed in place on the shaft and into the counterbores of the housing, with snap rings 1901 snapped into grooves 1805 and 1806 of the bearing shaft. The resulting assembly is a compact and freestanding bearing unit ready to mount to a bracket 1502 to make a spring perch according to an embodiment of the invention.

Figure 21:
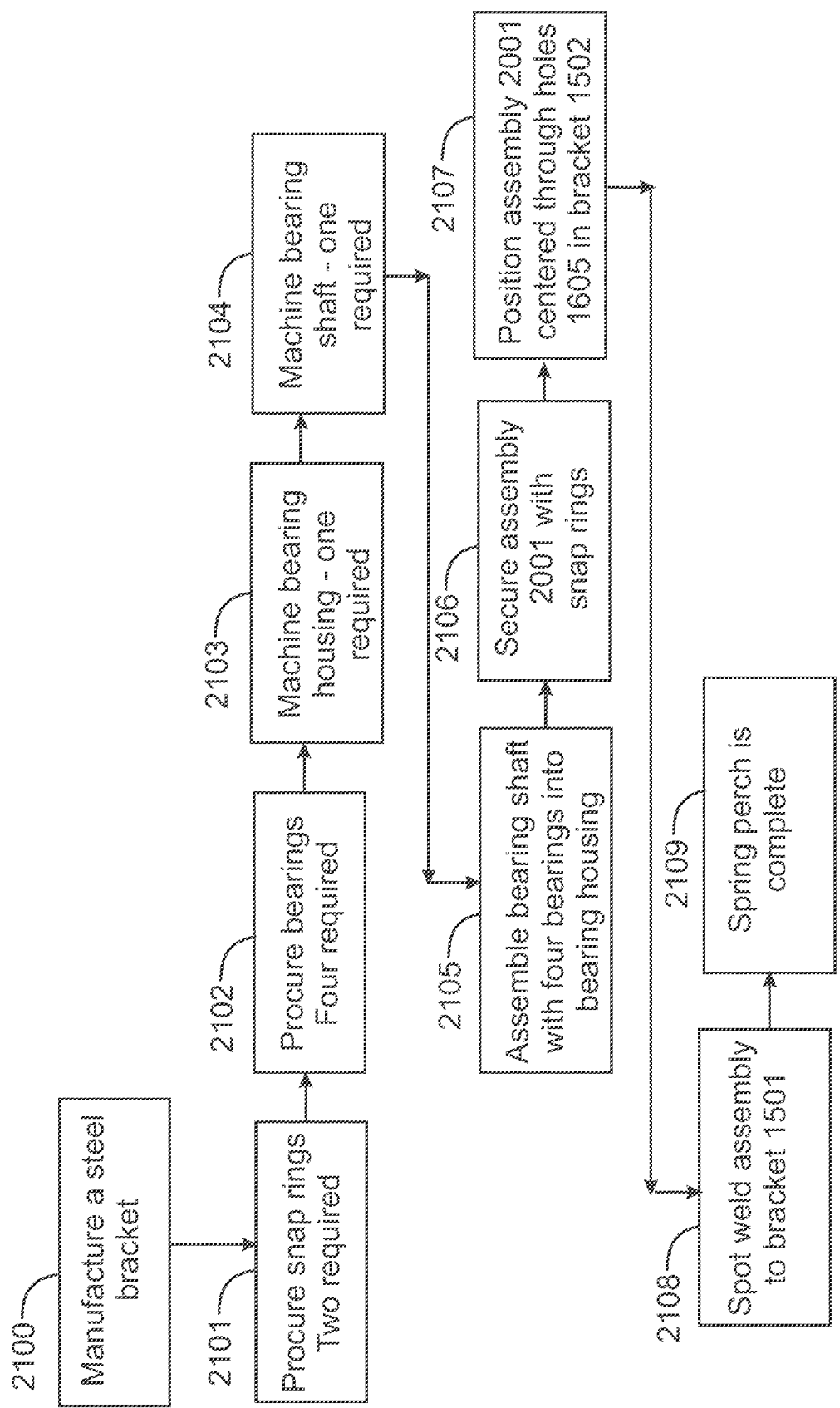
FIG. 21 is a flow diagram of a process for building a roller spring perch according to an embodiment of the invention.

FIG. 21 is a flow diagram of a process for building a roller spring perch according to an embodiment of the invention. At step 2101 two snap rings of a particular make and model are procured. At step 2102 four ball bearings of a specified make and model are procured. At step 2103 a bearing housing is machined according to specific specifications. At step 2104 a bearing shaft is machined according to specific specifications. At step 2105 the bearing shaft and the four bearings are assembled to the bearing housing. At step 2106 the assembly of the shaft, housing and bearings is secured with the snap rings. At step 2107 the bearing housing assembly is centered through holes 1606 in bracket 1502. It should be noted that the holes in bracket 1502 are of a diameter to be a slip fit for the outside diameter of the bearing housing, and the holes do not breakout any edge of the sidewalls of the steel bracket. The length of the bearing housing assembly is somewhat longer than the span over the walls of the bracket, so a short portion of the assembly extends on each side of the bracket 1502. At step 2108 the bearing housing assembly is spot welded to the bracket at two or more points. As the bearings are assembled before the spot welding is done, the spot welding is kept to a minimum to avoid distorting the bearing housing.

In prior art apparatus bearing housings are welded to a bracket prior to finish machining and assembly of bearings, and in the prior art only two bearings are used. In embodiments of the present invention the bearing assembly is fully assembled with shaft, four bearings, two on each side, the housing, and snap rings prior to welding to the bracket.

A person of ordinary skill in the art will understand that the embodiments described above with reference to the drawing figures are exemplary, and not limiting. There may well be other ways that the roller spring perch of the invention may be implements within the scope of the invention. The invention is limited only by the claims that follow.

I claim:

1. A method for creating a roller spring perch, comprising:
manufacturing a steel bracket having a bed with two shaped regions formed to accommodate mounting to a suspension spring, holes for mounting to shock absorbers, and two sidewalls each having a hole of a first diameter, the holes aligned on an axis orthogonal to the sidewalls;
procuring two snap rings;
procuring four bearings, each bearing having a second outer diameter, a third inner diameter, and a first width;
machining a steel cylindrical bearing housing of a fourth diameter with a first length, a central bore of a fifth diameter, and counterbores of a sixth diameter on each end to a second length from each end;
machining a bearing shaft with a central axis, the bearing shaft of a third length greater than the first length, the bearing shaft having central region of a seventh diameter less than the fifth diameter, bearing lands to each side of the central region, the bearing lands having each an eighth diameter as a press fit to the third inner diameter of the bearings, a fourth length twice the first width of the bearings, and a snap ring grooves at an end of each bearing land away from central region, the bearing shaft further having a flattened region on each end with a through hole at a right angle to the central axis of the bearing shaft;

assembling the bearing shaft to the bearing housing with two of the four bearings pressed onto each of the two bearing lands and the bearings fit into the counterbores of the bearing housing;

assembling the snap rings in the snap ring grooves of the bearing shaft, completing an assembly of the bearing housing, the bearing shaft and the bearings;

placing the bearing housing with the bearing shaft and bearings centered through the holes in the sidewalls of the steel bracket; and spot welding the bearing housing to the sidewalls of the steel bracket.

2. The method of claim 1 further comprising, in the step for spot welding, making two spot welds from the bearing housing to the inner surface of each side wall of the bracket.

3. The method of claim 2 further comprising, in the step for making two spot welds from the bearing housing to the inner surface of each side wall of the bracket, placing the spot welds on opposite sides of the bearing housing, with no spot weld at the top or bottom.

4. The method of claim 1 further comprising painting the assembled roller spring perch.

5. The method of claim 4 further comprising adhering mounting pads to the two shaped regions formed to accommodate mounting to a suspension spring.

6. The method of claim 4 further comprising assembling a bolt through the hole in the flattened region at each end of the bearing shaft and adding a nut to each bolt, for fastening the roller spring perch to an upper control arm of a suspension.

\* \* \* \* \*